(12) United States Patent
Spertus

(10) Patent No.: US 8,180,893 B1
(45) Date of Patent: May 15, 2012

(54) COMPONENT-LEVEL SANDBOXING

(75) Inventor: Michael Spertus, Chicago, IL (US)

(73) Assignee: Symantec Corporation, Mountain View, CA (US)

( * ) Notice: Subject to any disclaimer, the term of this patent is extended or adjusted under 35 U.S.C. 154(b) by 197 days.

(21) Appl. No.: 12/724,297

(22) Filed: Mar. 15, 2010

(51) Int. Cl.
*G06F 15/16* (2006.01)

(52) U.S. Cl. .................................. 709/224; 709/200

(58) Field of Classification Search .......... 709/200–203, 709/217–224, 225
See application file for complete search history.

(56) References Cited

U.S. PATENT DOCUMENTS

| | | | | |
|---|---|---|---|---|
| 6,941,470 B1 * | 9/2005 | Jooste | | 726/4 |
| 7,444,671 B2 * | 10/2008 | Jooste | | 726/4 |
| 7,451,482 B2 * | 11/2008 | Jooste | | 726/4 |
| 7,478,423 B2 * | 1/2009 | Jooste | | 726/4 |

* cited by examiner

*Primary Examiner* — Moustafa M Meky
(74) *Attorney, Agent, or Firm* — Fenwick & West LLP (57) ABSTRACT

Component-level sandboxing is implemented in the example context of an enterprise rights management system. A policy enforcement module monitors an application executing on a client to detect and evaluate data access requests in view of a rights policy. The policy enforcement module determines how to handle the request based on the whether the policy permits the request. If the request is permitted, the policy enforcement module allows the requests and sandboxes it using virtualization. The sandbox virtualizes the thread making the request and/or a data access component involved in the request. Other aspects of the application that do not implicate the rights policy are not sandboxed. In this way, sandboxing is used to enforce the rights policy in a manner that is transparent to the user and consumes relatively few resources of the client.

17 Claims, 4 Drawing Sheets

FIG. 4 ents. Moreover, this description occasionally omits the term "module" for purposes of clarity and convenience.

COMPONENT-LEVEL SANDBOXING

BACKGROUND

1. Field of the Invention

This invention pertains in general to virtualization and in particular to virtualization for data security.

2. Description of the Related Art

Virtualization deals with the abstraction of computer resources. Virtualization has many uses, such as partitioning a computer to, e.g., prevent code and data in one partition from interacting with code and data in another partition. While virtualization has benefits, there is overhead involved in invoking and using virtualization on the computer. This overhead can negatively impact the experience of the computer user.

Therefore, there is a need in the art for a way to provide the benefits of virtualization while minimizing any negative impact on the user of the computer in which the virtualization is occurring.

BRIEF SUMMARY OF THE INVENTION

The above and other needs are met by a method, computer, and non-transitory computer-readable storage medium storing executable computer program modules for sandboxing a data access request made by an application executing on a computer. An embodiment of the method comprises monitoring the application to detect the data access request made by the application, the application not executing within a sandbox. The method further comprises determining whether to sandbox the data access request and, responsive to a determination to sandbox the data access request, sandboxing the data access request while not sandboxing the application that made the request.

An embodiment of the computer comprises a non-transitory computer-readable storage medium storing executable computer program modules. The modules comprise a monitoring module for monitoring the application to detect the data access request made by the application, the application not executing within a sandbox, a request evaluation module for determining whether to sandbox the data access request, and a sandbox module for sandboxing the data access request while not sandboxing the application that made the request responsive to a determination to sandbox the data access request.

An embodiment of the non-transitory computer-readable storage medium stores executable computer program modules comprising a monitoring module for monitoring the application to detect the data access request made by the application, the application not executing within a sandbox, a request evaluation module for determining whether to sandbox the data access request, and a sandbox module for sandboxing the data access request while not sandboxing the application that made the request responsive to a determination to sandbox the data access request.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

Figure 1:
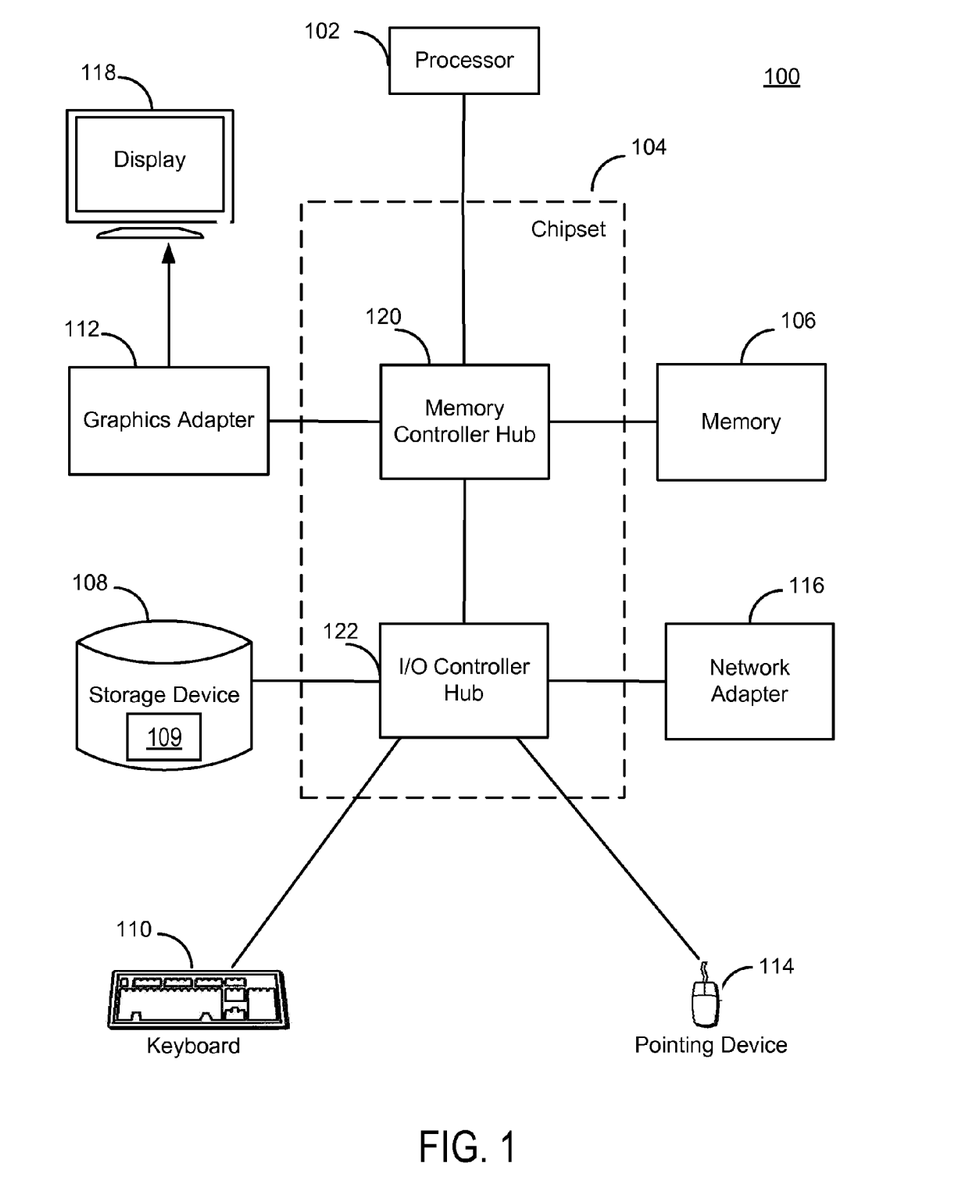
FIG. 1 is a high-level block diagram of a computer using component-level sandboxing to implement an enterprise rights management (ERM) system, in one embodiment.

FIG. 1 is a high-level block diagram of a computer 100 using component-level sandboxing to implement an enterprise rights management (ERM) system, in one embodiment. Component-level sandboxing has many uses and the ERM system in this description is just one example of how component-level sandboxing may be used. Although the remainder of this specification describes the use of component-level sandboxing in the implementation of the ERM system, component-level sandboxing can be used in other contexts.

Illustrated are at least one processor 102 coupled to a chipset 104. Also coupled to the chipset 104 are a memory 106, a storage device 108, a keyboard 110, a graphics adapter 112, a pointing device 114, and a network adapter 116. A display 118 is coupled to the graphics adapter 112. In one embodiment, the functionality of the chipset 104 is provided by a memory controller hub 120 and an I/O controller hub 122. In another embodiment, the memory 106 is coupled directly to the processor 102 instead of the chipset 104.

The storage device 108 is any non-transitory computer-readable storage medium, such as a hard drive, compact disk read-only memory (CD-ROM), DVD, or a solid-state memory device. As known in the art, the storage device 108 can hold files 109, and each file stores data. The files 109 can be of various types, depending upon the type of data stored in the file and/or the application that created the file. For example, files 109 can contain images, spreadsheets, word processing documents, etc.

The memory 106 holds instructions and data used by the processor 102. The pointing device 114 may be a mouse, track ball, or other type of pointing device, and is used in combination with the keyboard 110 to input data into the computer system 100. The graphics adapter 112 displays images and other information on the display 118. The network adapter 116 couples the computer system 100 to a local or wide area network.

As is known in the art, a computer 100 can have different and/or other components than those shown in FIG. 1. In addition, the computer 100 can lack certain illustrated components. Moreover, the storage device 108 can be local and/or remote from the computer 100 (such as embodied within a storage area network (SAN)).

As is known in the art, the computer 100 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 108, loaded into the memory 106, and executed by the processor 102.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 2:
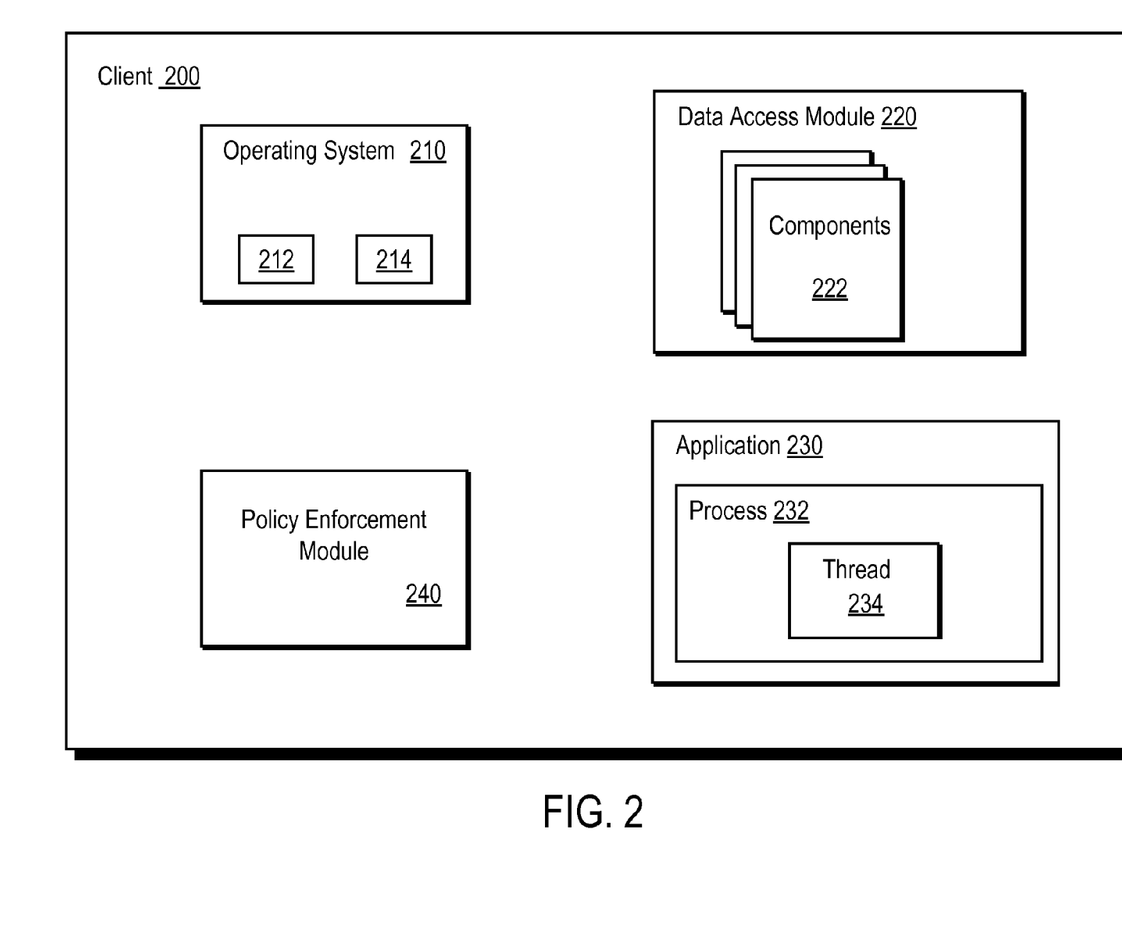
FIG. 2 illustrates a logical view of a client of the ERM system, such as a client formed of a computer like that shown in FIG. 1.

FIG. 2 illustrates a logical view of a client 200 of the ERM system, such as a client formed of a computer 100 like that shown in FIG. 1. Assume for purposes of this description that the ERM system is used by an enterprise, such as a business, educational institution, or government agency. The enterprise has multiple clients like the client 200 shown in FIG. 2, and each client is used by a user such as an employee of the enterprise. An administrator at the enterprise defines a rights policy that specifies rights to data maintained by the enterprise, and this policy is applied across the clients and users of the enterprise to implement the ERM system. For example, the rights policy might define user groups according to roles within the enterprise, e.g., groups for marketing, finance, development, and management. The rights policy might further specify different data access rights for each group. The rights policy can also specify rights policies applicable to specific files 109. For example, the rights policy can specify that a file containing salary data can be accessed only by users in the finance and management groups.

Turning now to the specific entities within the client 200 of FIG. 2, an operating system 210 controls the operation of the client 200 and provides an interface between the hardware and higher level functions. Examples of operating systems 210 that can execute on the client 200 include variants of WINDOWS from MICROSOFT CORP., OS X from APPLE, INC., and LINUX.

In one embodiment, the operating system 210 maintains a registry 212 that stores information related to the operation of the client 200. The registry 212 can describe, for example, the hardware attached to the client 200, the configuration of the operating system 210, and the applications 230 installed on the client. In one embodiment, the registry 212 also stores information describing how to access information stored on the storage device 108. For example, the registry can describe the components responsible for viewing files 109 of different types.

The operating system 210 may further include a shell 214 that provides a user interface (UI) used by the user to interact with the client 200. In some embodiments, the shell 214 provides a graphical UI (GUI) such as the WINDOWS EXPLORER interface provided by the WINDOWS operating system. A user can use the shell 214 to perform actions such as viewing files 109, and information about files, stored on the storage device 108. For example, the user can interact with the shell 214 to view icons of files 109 contained in a directory of the storage device 108. During such an interaction, the shell 214 accesses the registry 212 to identify the data access components 222 for generating the icons for different types of files 109 contained in the directory.

A data access module 220 stores data access components 222 for interacting with files 109 of various types and/or other types of data. The data access components 222 can be supplied by the operating system 210 and/or by applications 230 that extend the functionality provided by the operating system. In embodiments using the WINDOWS operating system, the data access components 222 include shell extension handlers implemented as dynamic link libraries (DLLs). In general, a data access component 222 supports access to one or more types of files 109. For example, a data access component 222 can perform the generation of icons, thumbnails, property pages, and/or previews for a particular type of file 109.

As mentioned above, the registry 212 stores the associations between the file types and the data access components 222 for the files 109. In one embodiment, when the shell 214, application 230, or another entity seeks to access a file 109 of a specific type, it consults the registry 212 to determine if a data access component 222 exists for that type of file. If a data access component 222 exists, the shell 214 uses the data access component 222 to perform the file access. For example, if the shell 214 needs to generate a preview of a specific type of file, it consults the registry 212 to identify the data access component 222 that generates previews of that type of file, and then interacts with the component to generate the preview.

The client 200 also includes one or more applications 230. The applications 230 execute under control of the operating system 210 and are used by the user to perform tasks. Examples of applications 230 that can execute on the client 200 include word processors, email programs, web browsers, spreadsheets, and image editors. In addition, the operating system shell 214 is also considered an application 230 in this description.

A user uses an application 230 to access data stored on the storage device 108. For example, the user can interact with the application 230 to view, modify, print, or distribute files 109 on the storage device 108. To perform these functions, the application 230 typically interacts with operating system 210 and the data access module 220 to retrieve the files 109 and/or parts of the file used by the application 230. For example, if the user uses an application 230 to view files 109 in a directory, the application 230 may interact with the registry 212 of the operating system 210 to determine the data access components 222 of the data access module 220 that generate the icons for the specific files 109 contained in the directory. The application 230 then interacts with those components to generate the icons for display to the user.

In one embodiment, an application 230 is instantiated as one or more processes 232 by the operating system 210. Each process 232 can run in its own address space, and has one or more threads 234 of execution within the address space performing tasks for the application 230. For example, a thread 234 can interact with the registry 212 and data access components 222 to present the view of files 109 in a directory to a user of the client 200 as described above.

A policy enforcement module 240 enforces the rights policy for the ERM system. In general, the policy enforcement module 240 determines the rights policy applicable to the user, client 200, and/or file 109 and prevents the user from performing any actions that violate the policy. For example, if the rights policy specifies that the user is not allowed to view the contents of a particular file 109, the policy enforcement module 240 prevents the user from using the preview function of the application 230 to view the file contents. Likewise, if the rights policy specifies that the user can view, but not distribute the contents of a file, the policy enforcement module 240 prevents the user from using the "Print Screen" key or any other functionality that captures an image of the file contents (since the user could then distribute the image in violation of the policy).

In one embodiment, the policy enforcement module 240 monitors individual data access requests made by threads 234 of applications 230 to determine whether the requested data access is permitted under the rights policy. For example, the policy enforcement module 240 can identify the specific data access component 222 that a thread 234 is requesting to use, and determine whether use of this component 222 is permitted by the rights policy. If the requested data access is not permitted, the policy enforcement module 240 blocks the requested data access and/or performs another action. If, on the other hand, the requested data access is permitted, the policy enforcement module 240 uses component-level sandboxing on the requested data access in a way that allows the request to proceed but still enforces the policy. In one embodiment, the component-level sandboxing virtualizes the data access but not other aspects (e.g., threads, processes) of the application unrelated to policy enforcement.

Using component-level sandboxing, the policy enforcement module 240 enforces the rights policy while allowing the user to have relatively unimpeded access to the full capabilities of the client 200 and the applications 320 residing therein. The policy enforcement module 240 does not require application-specific plug-ins or similar functionality that might be used by conventional ERM systems and the user is thus free to use essentially any application 230 supported by the client 200. In addition, the actions of the policy enforcement module 240 are transparent to the user and consume relatively few resources of the client 200 since virtualization is invoked at only the component level.

Figure 3:
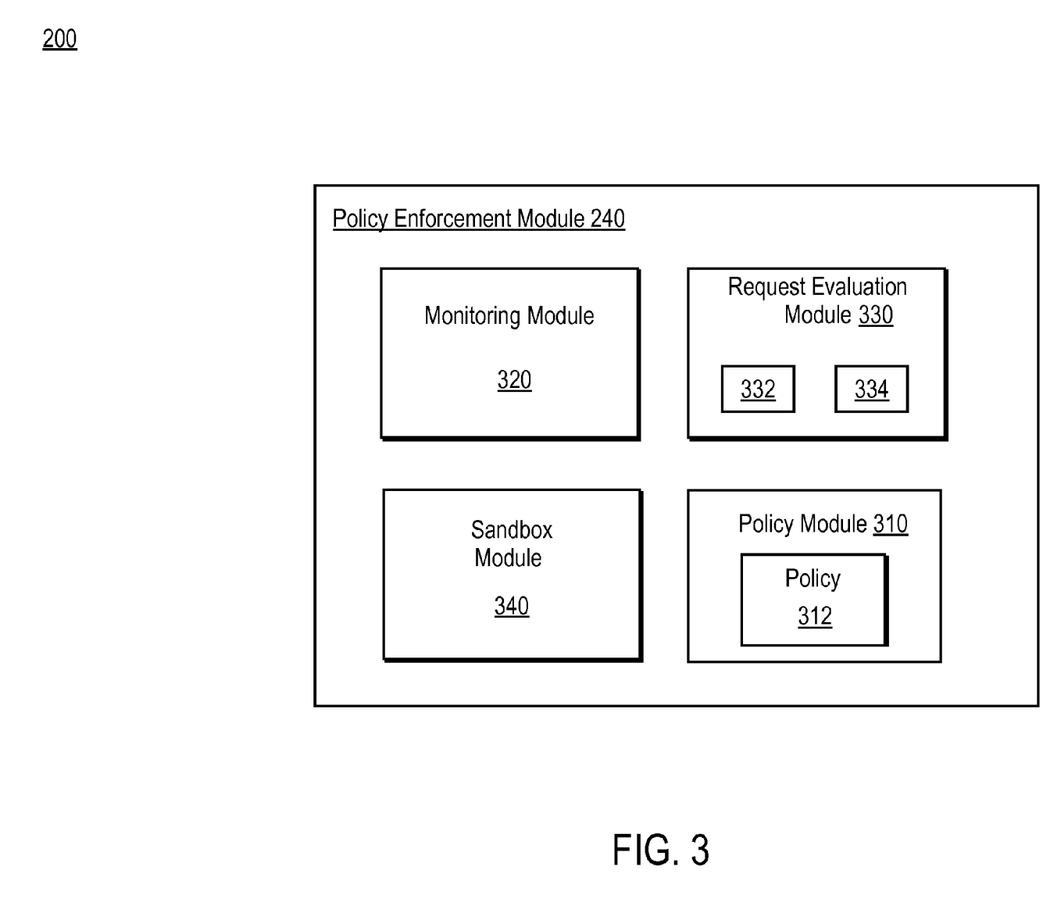
FIG. 3 illustrates the logical view of the policy enforcement module according to one embodiment.

FIG. 3 illustrates the logical view of the policy enforcement module 240 according to one embodiment. A policy module 330 within the policy enforcement module 240 stores one or more rights policies 312 for the ERM system. As mentioned above, a rights policy 312 delineates the rights of users or groups of users with respect to files 109 and other data. For example, the rights policy 312 can specify the rights of various user groups with respect to particular files 109. To this end, the rights policy 312 can specify the kinds of actions each user group may perform on various files 109. Thus, the rights policy 312 may permit one group of users to read, modify, and print a file 109, and permit another user group to only read the file 109. Different embodiments can specify different sets of rights and apply the policy to users and files in different manners.

A monitoring module 320 monitors the applications 230 to detect data access requests by the applications that implicate the rights policy 312. For example, the monitoring module 320 monitors for requests by the shell 214 to view a directory containing files, to open, modify, or preview a file 109, or perform other such actions that implicate the rights policy 312. Other embodiments of the monitoring module 320 monitor for activities other than data access requests.

In one embodiment, the monitoring module 320 monitors an application 230 by identifying the active processes 232 for the application 230 and observing the actions of the threads 234 of the processes 232. This monitoring can be performed by hooking the operating system 210 to intercept registry 212 access requests seeking to identify data access components 222 for files 109. Specifically, the monitoring can be performed by hooking the interfaces of the data access components 222 in order to detect data access requests that invoke the interfaces. In addition, the monitoring module 320 can identify threads 234 to monitor by hooking the operating system 210 to intercept thread creation requests made by applications 230. The monitoring module 320 can additionally hook other aspects of the operating system 210 that are related to the policy 312, such as hooks to intercept calls for performing the "print screen" function.

A request evaluation module 330 evaluates data access requests detected by the monitoring module 320 to determine whether the requests are permitted by the rights policy 312. One embodiment of the request evaluation module 330 analyzes an intercepted request to identify the file 109 for which access is requested. In addition, the request evaluation module 330 identifies the rights of the user with respect to that file 109 as specified by the rights policy 312. In view of these factors, the request evaluation module 330 determines how to handle the access request. Broadly, the request evaluation module 330 denies the request if it violates the rights policy 312, or permits the request to proceed but sandboxes the request if it is not expected to violate the rights policy 312.

One embodiment of the request evaluation module 330 includes a component identification (ID) module 332 for identifying a data access component 222 involved in a data access request and analyzing the component 222 to determine whether an access made using that component 222 is permitted under the rights policy 312. In one embodiment, the component ID module 332 determines the type of file 109 that the request seeks to access, and examines the registry 212 to identify the data access component 222 for that file type. The component ID module 332 then determines whether the identified data access component 222 is permitted under the rights policy 312. One embodiment of the component ID module 332 maintains recognition data 334 that identify known data access components 222 for which use is permitted.

The recognition data 334 can include a white list identifying data access components 222 that are permitted. For example, the white list can list a data access component 222 that merely generates a generic icon for a file 109, since such a component 222 does not access the contents of the file and would not violate a rights policy 312 that prohibits access to the file's contents. The recognition data 334 can also include a black list of data access components 222 that are not permitted. For example, the black list can list a data access component 222 that generates a preview of the contents of a file because such a component would violate a rights policy 312 that prohibits access to the file's contents. The recognition data 334 can hold multiple white lists and blacklists depending upon the rights enforced by the rights policy 312, and/or can include information in a list indicating which rights are implicated by listed components and permitted under different rights policies. The recognition data 334 can identify the data access components 222 using hashes, digital signatures, fingerprints, or other similar techniques. In one embodiment, the permitted data access components are initially identified by examining components installed by common and/or well-known applications.

If a data access component 222 is unknown, i.e., is not listed in the recognition data 334, an embodiment of the component ID module 332 treats the component as not permitted (i.e., as violating the rights policy 312). One potential way for a malicious user to defeat the restrictions of the rights policy 312 is to register a malicious data access component in the registry 212. For example, a malicious user could replace a standard data access component 222 with a component that performs a different action, such as one that displays the contents of the file or copies the contents to another location. Use of the recognition data 334 can defeat this type of attack.

Some embodiments of the component ID module 332 use techniques other than those described above to determine whether use of a data access component 222 is permitted. The component ID module 332 can perform a static analysis of the data access component 222 to determine whether the component will violate the policy 312 when executed. The static analysis can analyze the symbol table or other aspects of the data access component 222 to determine whether the component writes data to a shared memory area that could be accessed by other threads or processes on the client 200. A component 222 that writes to a shared memory area can potentially violate the rights policy 312 and might not be permitted. The component ID module 332 can also perform a behavioral analysis of the data access component 222 by allowing the component to execute and then monitoring its execution for writes to shared memory or other actions that might violate the rights policy.

The component ID module 332 can activate at times other than when a data access request is being evaluated. In some embodiments, the component ID module 332 examines the registry 212 at predetermined times, such as after an application 230 is installed on the client 200, when modifications to the registry occur, and/or on a calendar-based schedule (e.g., once a week). In one embodiment, the component ID module 332 reports detection of an unknown data access component 222 to the user of the client 200 and/or to the administrator of the ERM system. The request evaluation module 330 can also remediate the unknown component 222 by, e.g., restoring a known data access component 222 for the file type.

As mentioned above, the request evaluation module 330 blocks a data access request if the request is not permitted. For example, if the rights policy 312 completely prohibits the user from viewing a file 109, the request evaluation module 330 can block a data access request that seeks to access the file 109. Thus, if the user is using the shell 214 to view a directory containing the file 109, the request evaluation module 330 blocks the data access request for the file 109 and makes it seem as if the file 109 does not exist. The request evaluation module 330 may also provide the user a notification, for example a pop-up window, when the data access request is blocked.

If the request is permitted under the rights policy 312, an embodiment of the request evaluation module 330 allows the request to proceed, but "sandboxes" the request. A "sandbox" is a restricted environment in which the actions of the request are tightly controlled. In one embodiment, the sandboxed data access request is allowed to proceed but is virtualized to prevent violation of the rights policy 312. Examples of data access requests that are sandboxed in some embodiments include requests for data that the user has the right to view but not distribute under a policy 312, and/or requests to write to a file 109 that the user does not have the right to modify.

A sandbox module 340 implements the sandbox for the data access request. One embodiment of the sandbox module 340 implements sandboxing by virtualizing at a fine grain; data access requests that are permitted by the rights policy 312 are virtualized, while other aspects of the application 230 are not virtualized. This technique is referred to as "component-level" virtualization (or "component-level sandboxing") because the virtualization occurs at the level of the data access request, which is below the application or process level.

This form of virtualization thus allows for greater transparency and reduced overhead by the ERM system, because only part of the application 230 is virtualized. Component-level virtualization does not require that the entire application 230 be virtualized, or that the virtualization be in effect at all times. Rather, the virtualization is in place while a data access (or other action that implicates the rights policy 312) is occurring. Virtualization need not occur during other times, and other aspects of the application 230 unrelated to the data access need not be virtualized.

The sandbox module 340 can virtualize a data access request in several ways. One embodiment of the sandbox module 340 virtualizes the data access request by virtualizing the thread 234 of the process 232 that is making the data access request. To this end, the sandbox module 340 can use the same hooks used by the monitoring module 320 to intercept requests made by threads 234 of the process 232 seeking to identify data access components 222. Once these requests are detected, the sandbox module 340 can substitute virtualized functionality for the normal functionality of the operating system 210 and/or data access components 222 that performs the requested data access while ensuring that the rights policy 312 is enforced.

Another embodiment of the sandbox module 340 virtualizes a data access request by virtualizing the data access component 222 identified by the data access request. This type of virtualization allows the data access component 222 to execute and interact with the requesting thread 234, but virtualizes interfaces called by the data access component 222 to ensure that the rights policy 312 is enforced. Thus, the data access component 222 operates in a virtualized environment.

Regardless of the specific virtualization technique used, the sandbox module 340 can also hook other aspects of the operating system 210 to perform the virtualization. For example, the sandbox module 340 can hook interfaces related to thread creation requests to detect when the virtualized thread 234 and/or virtualized data access component 222 creates a new thread. The sandbox module 340 can then virtualize the new thread for the duration of its existence. The sandbox module 340 can also hook interfaces related to the assignment of tasks to a thread pool. The sandbox module 340 can detect when the virtualized thread 234 and/or virtualized data access component 222 assigns a task to a thread in the thread pool, and can virtualize the thread that is assigned to the task for the duration of the execution of the assigned task. Further, the sandbox module 340 can hook operating system 210 calls to write data and virtualize the writes. For example, if the data access component 222 writes data to a file 109 that the user lacks permission to modify, the virtualization module 340 can virtualize the write so that the write is made to a private copy of the file associated with the user and not to the protected instance of the file 109. Additionally, the sandbox module 340 can hook other calls and temporarily virtualize them based on the data access request. For example, the sandbox module 340 can hook an operating system 210 call used to perform the print screen function and virtualize it to temporarily block a screen print when a data access component 222 is being used to view a file 109 for which the user lacks permission to distribute.

Figure 4:
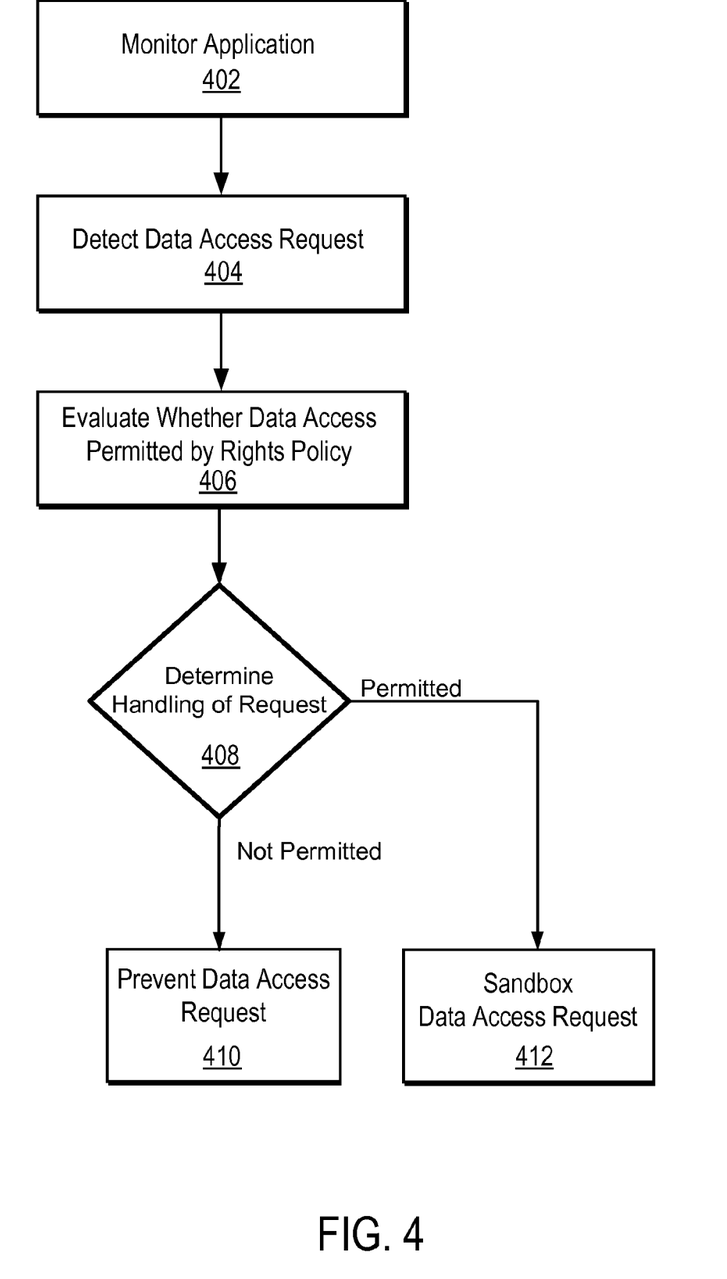
FIG. 4 shows a flow chart illustrating the operation of the policy enforcement module according to one embodiment.

FIG. 4 shows a flow chart illustrating the operation of the policy enforcement module 240 according to one embodiment. The policy enforcement module 240 monitors 402 an application 230 executing on the client 200 to detect 404 data access requests. For example, the policy enforcement module 240 can detect that the application 230 is requesting a preview of a file 109 in a directory. The policy enforcement module 240 evaluates 404 the requested data access to determine 406 whether it is permitted by a rights policy 312. In one embodiment, this evaluation 404 includes analyzing the data access component 222 involved in the request to determine whether the component is recognized. The policy enforcement module 404 determines 408 how to handle the request based on the whether it is permitted. The policy enforcement module 404 prevents 410 the data access request if it is not permitted. The policy enforcement module 240 sandboxes 412 the data access request if it is permitted. The sandboxing 412 allows the request to proceed but virtualizes the data access component 222 and/or thread 234 making the request to prevent any violation of the rights policy 312.

In this way, the policy enforcement module 240 uses knowledge of specific application 230 behavior to make fine grained decisions in order to prevent violation of the rights policy 312. By sandboxing data access requests, the policy enforcement module 240 enforces the rights policy 312 while allowing the user to have relatively unimpeded access to the full capabilities of the client 200 and applications executing thereon. As a result of using component-level sandboxing, the policy enforcement module 240 is transparent to the user and consumes relatively few resources of the client 200.

While the discussion above focuses on using component-level virtualization to sandbox data access requests, the techniques described above can be used in any instance where virtualization is desired, regardless of whether a data access request is occurring.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of sandboxing a data access request made by an application executing on a computer, comprising:
   monitoring the application to detect the data access request made by the application, the application not executing within a sandbox;
   determining whether to sandbox the data access request; and
   responsive to a determination to sandbox the data access request, sandboxing the data access request while not sandboxing the application that made the request by:
      identifying a thread that made the data access request for the application; and
      sandboxing the thread that made the data access request while not sandboxing other threads of the application.

2. The method of claim 1, wherein monitoring the application to detect the data access request made by the application comprises:
   identifying an interface of a data access component that performs data access requests; and
   monitoring the interface to detect invocation of the interface by the application making the data access request.

3. The method of claim 1, comprising:
   monitoring the application to detect a second data access request made by the application; and
   virtualizing the second data access request while not virtualizing the application that made the second request.

4. The method of claim 1, wherein identifying a thread that made the data access request for the application comprises identifying an assignment of a task associated with the data access request to the thread; and wherein sandboxing the thread that made the data access request comprises sandboxing the thread that is assigned to the task for a duration of an execution of the assigned task.

5. The method of claim 1, comprising:
   monitoring the application to detect a second data access request made by the application; and
   identifying a data access component referenced by the second data access request; and
   sandboxing the data access component while not sandboxing the application that made the second request.

6. The method of claim 1, wherein determining whether to sandbox the data access request comprises:
   identifying a data access component referenced by the data access request;
   using recognition data to determine whether the identified data access component is recognized; and
   permitting the data access request responsive to recognition of the data access component.

7. The method of claim 6, wherein the recognition data comprise a white list identifying data access components that are permitted under a rights policy and wherein determining whether the data access request is recognized comprises determining whether the data access component is listed on the white list.

8. A computer for sandboxing a data access request made by an application executing on the computer, comprising:
   a non-transitory computer-readable storage medium storing executable computer program modules comprising:
      a monitoring module for monitoring the application to detect the data access request made by the application, the application not executing within a sandbox;
      a request evaluation module for determining whether to sandbox the data access request; and
      a sandbox module for, responsive to a determination to sandbox the data access request, sandboxing the data access request while not sandboxing the application that made the request by:
         identifying a thread that made the data access request for the application; and
         sandboxing the thread that made the data access request while not sandboxing other threads of the application.

9. The computer of claim 8, comprising:
   monitoring the application to detect a second data access request made by the application; and
   virtualizing the second data access request while not virtualizing the application that made the request.

10. The computer of claim 8, comprising:
    monitoring the application to detect a second data access request made by the application; and
    identifying a data access component referenced by the second data access request; and
    sandboxing the data access component while not sandboxing the application that made the second request.

11. The computer of claim 8, wherein determining whether to sandbox the data access request comprises:
    identifying a data access component referenced by the data access request;
    using recognition data to determine whether the identified data access component is recognized; and
    permitting the data access request responsive to recognition of the data access component.

12. The computer of claim 11, wherein the recognition data comprise a white list identifying data access components that are permitted under a rights policy and wherein determining whether the data access request is recognized comprises determining whether the data access component is listed on the white list.

13. A non-transitory computer-readable storage medium storing executable computer program modules for sandboxing a data access request made by an application executing on a computer, the modules comprising:
    a monitoring module for monitoring the application to detect the data access request made by the application, the application not executing within a sandbox;
    a request evaluation module for determining whether to sandbox the data access request; and
    a sandbox module for, responsive to a determination to sandbox the data access request, sandboxing the data access request while not sandboxing the application that made the request by:
       identifying a thread that made the data access request for the application; and
       sandboxing the thread that made the data access request while not sandboxing other threads of the application.

14. The computer-readable storage medium of claim 13, comprising:
    monitoring the application to detect a second data access request made by the application; and
    virtualizing the second data access request while not virtualizing the application that made the request.

15. The computer-readable storage medium of claim 13, comprising:

monitoring the application to detect a second data access request made by the application; and identifying a data access component referenced by the second data access request; and sandboxing the data access component while not sandboxing the application that made the second request.

16. The computer-readable storage medium of claim 13, wherein determining whether to sandbox the data access request comprises:

identifying a data access component referenced by the data access request;

using recognition data to determine whether the identified data access component is recognized; and permitting the data access request responsive to recognition of the data access component.

17. The computer-readable storage medium of claim 16, wherein the recognition data comprise a white list identifying data access components that are permitted under a rights policy and wherein determining whether the data access request is recognized comprises determining whether the data access component is listed on the white list.

* * * * *